(12) United States Patent
Bin et al.

(10) Patent No.: US 11,054,725 B2
(45) Date of Patent: Jul. 6, 2021

(54) GIMBAL STRUCTURE AND CAMERA ASSEMBLY

(71) Applicant: SZ DJI OSMO TECHNOLOGY CO., LTD., Shenzhen (CN)

(72) Inventors: Peng Bin, Shenzhen (CN); Tianhang Ma, Shenzhen (CN)

(73) Assignee: SZ DJI OSMO TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/590,049

(22) Filed: Oct. 1, 2019

(65) Prior Publication Data
US 2020/0026163 A1 Jan. 23, 2020

Related U.S. Application Data

(63) Continuation of application No. PCT/CN2017/079742, filed on Apr. 7, 2017.

(51) Int. Cl.
*G03B 17/56* (2021.01)
*F16M 11/10* (2006.01)
(Continued)

(52) U.S. Cl.
CPC ........... *G03B 17/561* (2013.01); *F16M 11/10* (2013.01); *F16M 13/02* (2013.01); *G03B 17/02* (2013.01);
(Continued)

(58) Field of Classification Search
CPC .................................................. G03B 17/561
See application file for complete search history.

(56) References Cited

U.S. PATENT DOCUMENTS

| | | | | |
|---|---|---|---|---|
| 5,536,917 A * | 7/1996 | Suppelsa | ................. | B29C 65/08 156/752 |
| 7,736,071 B2 * | 6/2010 | Wahl | .................... | G03B 17/561 396/419 |

(Continued)

FOREIGN PATENT DOCUMENTS

| | | |
|---|---|---|
| CN | 203656374 U | 6/2014 |
| CN | 204452948 U | 7/2015 |

(Continued)

OTHER PUBLICATIONS

The World Intellectual Property Organization (WIPO) International Search Report for PCT/CN2017/079742 dated Jan. 15, 2018 5 pages.

*Primary Examiner* — Clayton E. LaBalle
*Assistant Examiner* — Leon W Rhodes, Jr.
(74) *Attorney, Agent, or Firm* — Anova Law Group, PLLC (57) ABSTRACT

A camera assembly of a gimbal structure is provided. The camera assembly includes a housing and a camera module disposed inside the housing. The camera assembly also includes a cable disposed inside the housing. The cable includes a first connection end, a second connection end, and a transition segment disposed between and connecting the first connection end and the second connection end. The first connection end is configured to connect with the camera module, the second connection end is configured to connect with an external device located outside of the housing. The transition segment includes a first transition segment disposed bending around a first rotation axis of the gimbal structure. The camera assembly is configured to rotate around the first rotation axis of the gimbal structure.

20 Claims, 6 Drawing Sheets

(51) Int. Cl.
  *F16M 13/02* (2006.01)
  *G03B 17/02* (2021.01)
  *F16M 11/12* (2006.01)
  *G03B 15/00* (2021.01)

(52) U.S. Cl.
  CPC .......... *F16M 11/125* (2013.01); *G03B 15/006* (2013.01)

(56) References Cited

U.S. PATENT DOCUMENTS

| | | | |
|---|---|---|---|
| 10,581,233 B2 * | 3/2020 | Liu | .................... H04N 5/23203 |
| 2016/0273703 A1 | 9/2016 | Li | |

FOREIGN PATENT DOCUMENTS

| | | | |
|---|---|---|---|
| CN | 205469862 U | | 8/2016 |
| CN | 205555624 U | | 9/2016 |
| CN | 205560201 U | | 9/2016 |
| CN | 205752639 U | | 11/2016 |
| CN | 205781782 U | | 12/2016 |
| CN | 205938393 U | | 2/2017 |
| CN | 206723741 U | | 12/2017 |
| JP | 2006291931 A | * | 10/2006 |

* cited by examiner

GIMBAL STRUCTURE AND CAMERA ASSEMBLY

CROSS-REFERENCE TO RELATED APPLICATION

This application is a continuation application of International Application No. PCT/CN2017/079742, filed on Apr. 7, 2017, the entire content of which is incorporated herein by reference.

TECHNICAL FIELD

The present disclosure relates to the technology field of gimbals and cameras and, more particularly, to a gimbal structure and a camera assembly.

BACKGROUND

With the high speed advancement of science and technology, people's requirements on electronic devices for miniaturization, reliability, and high precision have become higher and higher. In the field of aerial photography, it has become a new trend to use even smaller aircrafts and even smaller gimbal cameras, which enable a user to conveniently carry a photographing product.

Because s small aircraft is constrained by its space and limited load capacity, relatively smaller gimbals and cameras are typically used as imaging devices. A microcontroller may need to control the motor of the gimbal and transmit data of the camera through a wire. However, due to the relatively small volume of the gimbal, configuring the wire on the structure will cause the following issues: (1) because the space of the gimbal is small and because the number of the wires is large, the wires cannot be configured, or it is easy to break the wires. (2) the motor tends to overheat. Because the rotation angle of the wire stock of the wire is relatively large, the wire may generate a large torque. Such torque is a load on the gimbal motor, which reduces the controllability of the gimbal motor, and in the meantime, causes the motor to generate heat. (3) Because the overall volume of the gimbal is small, the bending radius allowable for the wire stock of the wire is small. (4) Because the bending radius is small, the rotation angle is large, which can cause a large internal stress in the wire stock of the wire in the bending process, which in turn reduces the operation lifetime of the wire. (5) An ordinary wire stock does not have a signal shielding function, and signal interference tends to occur between components.

In order to avoid the above issues, currently available related gimbal cameras typically adopt a solution that increases the gimbal volume, such that the wire has a sufficient moving space. However, in the meantime, the gimbal camera device has the disadvantages of having a large volume.

SUMMARY

In accordance with an aspect of the present disclosure, there is provided a camera assembly of a gimbal structure. The camera assembly includes a housing and a camera module disposed inside the housing. The camera assembly also includes a cable disposed inside the housing. The cable includes a first connection end, a second connection end, and a transition segment disposed between and connecting the first connection end and the second connection end. The first connection end is configured to connect with the camera module, the second connection end is configured to connect with an external device located outside of the housing. The transition segment includes a first transition segment disposed bending around a first rotation axis of the gimbal structure. The camera assembly is configured to rotate around the first rotation axis of the gimbal structure.

In accordance with another aspect of the present disclosure, there is provided a gimbal structure including a gimbal body and a camera assembly disposed on the gimbal body. The camera assembly includes a housing and a camera module disposed inside the housing. The camera assembly also includes a cable disposed inside the housing. The cable includes a first connection end, a second connection end, and a transition segment disposed between and connecting the first connection end and the second connection end. The first connection end is configured to connect with the camera module, the second connection end is configured to connect with an external device located outside of the housing. The transition segment includes a first transition segment disposed bending around a first rotation axis of the gimbal structure.

According to the gimbal structure of the present disclosure, a first transition segment of a transition segment of a cable of a camera assembly is configured as being disposed to bend around a first rotation axis. When the camera assembly rotates around the first rotation axis, the camera assembly causes the cable to rotate relative to the first rotation axis, which can effectively reduce the torque applied on the cable by the camera assembly during the process of rotating around the first rotation axis, thereby reducing the resistance of the gimbal motor driving the entire camera assembly.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for describing relative positional relationship.

The terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, the term "and/or" may be interpreted as "at least one of." For example, A and/or B can mean at least one of A or B. The term "communicatively couple(d)" or "communicatively connect(ed)" indicates that related items are coupled or connected through a communication channel, such as a wired or wireless communication channel. The term "cable" may be exchangeable with the term "wire."

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

Illustrative embodiments will be described in detail. Such illustrations are shown in the accompanying drawings. When the following descriptions refer to a drawing, unless otherwise noted, the same numbers used in different drawings refer to the same or similar elements. The implementations described in the following illustrative embodiments do not represent all the implementations consistent with the present disclosure. Instead, they are only examples of devices and methods that are consistent with some aspects of the present disclosure described in the claims.

As described herein, the terms used in the specification of the present disclosure are intended to describe example embodiments, instead of limiting the present disclosure. In addition, the singular forms "a," "an," "said," and "the" are intended to include the plural forms as well, unless the context indicates otherwise.

A typical gimbal camera has a relatively small volume. The camera module in the gimbal camera almost occupies all of the internal space of the gimbal camera. Therefore, the space for configuring the wire is very small. In addition, the wire stock of the wire typically adopts a wire routing manner in which a wire is extended through a side of the gimbal camera from an interior of the gimbal camera, and then bends for a predetermined angle to connect with an external device. In such a wire routing manner, because the wire stock directly bends, the bending radius and the bending angle are relatively small. The wire stock may deform at a certain degree in a trend to restore to its original state due to the elastic force of itself. This may cause the wire stock to deform and tend to rub against other components inside the gimbal camera. In addition, because the gimbal camera may rotate around a rotation axis in operation, using the above wire routing manner for the wire stock may cause a relatively large pulling force and torque to be experienced by the wire stock during the rotation process of the gimbal camera, which tends to cause the fracture or abrasion issue for the wire stock.

In view of the above, the present disclosure provides a gimbal structure and a camera assembly, which can effectively avoid the issues of causing an excessively large pulling force and torque on the wire stock during the rotation process of the camera module, and avoid the issue related to the elastic force of the wire stock being relatively large. Next, the gimbal structure and camera assembly of the present disclosure will be described with reference to the accompanying drawings. When there is no conflict, features of the following embodiments or implementation methods may be combined in a suitable manner.

Figure 1:
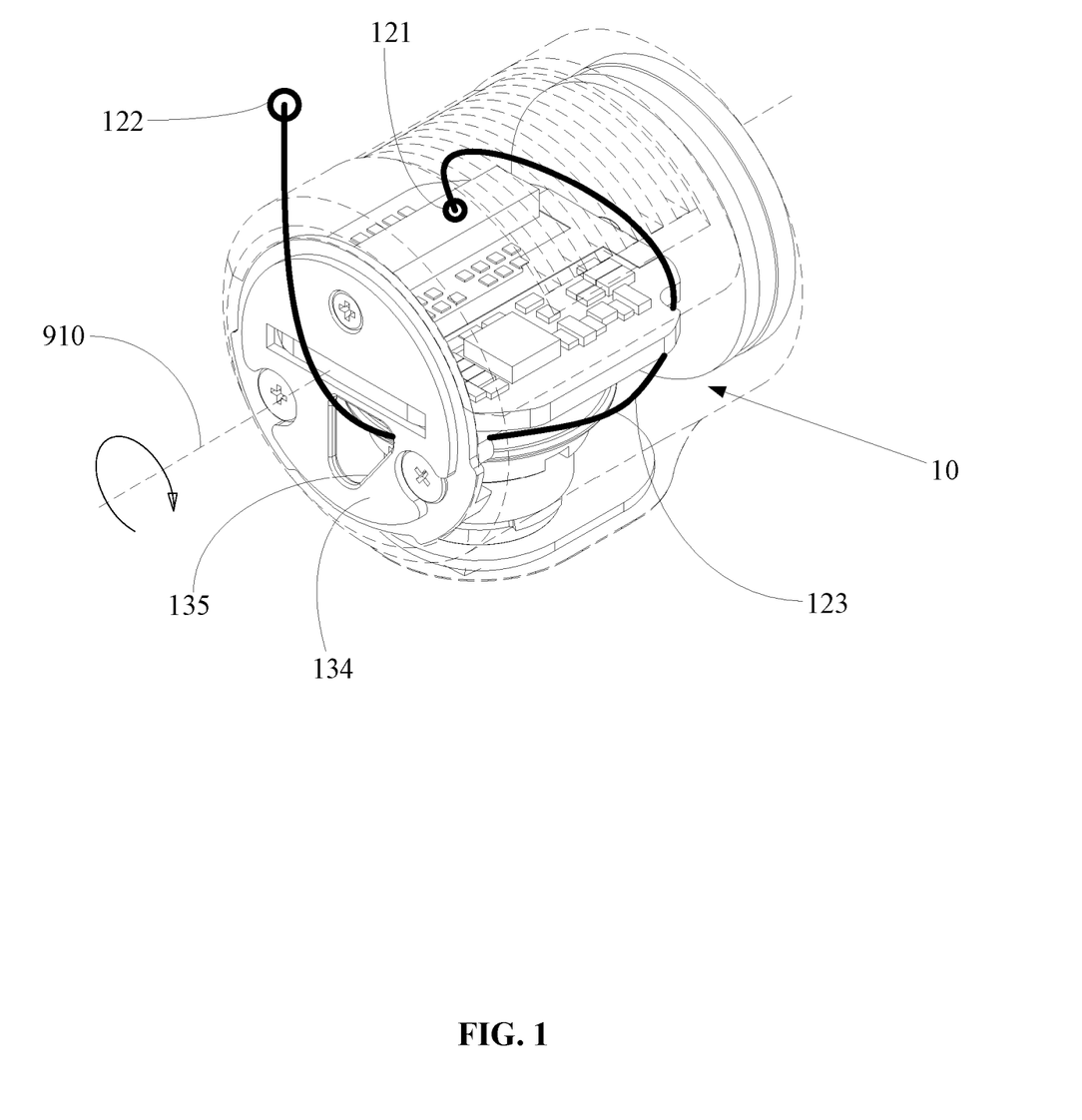
FIG. 1 is a structural illustration of wire routing of a camera assembly, according to an example embodiment.
Figure 2:
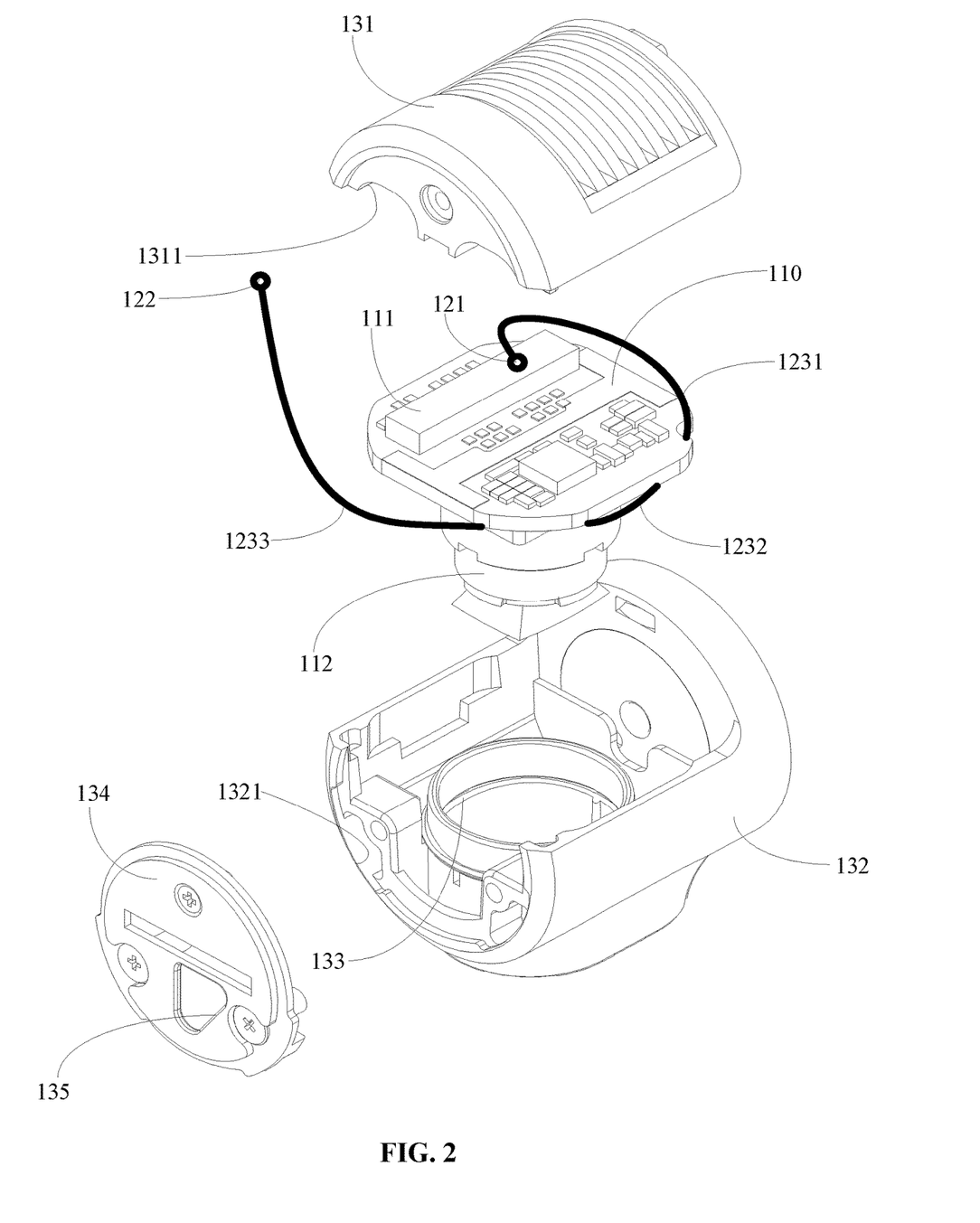
FIG. 2 is an exploded view of the camera assembly, according to an example embodiment.

Referring to FIG. 1 and FIG. 2, the present disclosure provides a camera assembly 10 of a gimbal structure. The camera assembly 10 may be configured to rotate around a first rotation axis 910 of the gimbal structure. The camera assembly 10 may include: a housing, a camera module 110 disposed inside the housing, and a cable laid out inside the housing. The cable may include a first connection end 121, a second connection end 122, and a transition segment 123 disposed between and connecting the first connection end 121 and the second connection end 122. The first connection end 121 may be connected with the camera module 110. The second connection end 122 may be configured to connect with an external device (e.g., a body of an unmanned aerial vehicle, etc.) disposed outside of the housing. The transition segment 123 may include a first transition segment 1231 configured to bend around the first rotation axis 910.

In the camera assembly 10 of the present disclosure, by configuring the first transition segment 1231 of the transition segment of the cable to bend around the first rotation axis 910 of the gimbal structure, the bending radius and bending angle of the cable are effectively increased. When the camera assembly rotates around the first rotation axis 910, the first transition segment 1231 of the transition segment 123 may also rotate around the first rotation axis 910, thereby reducing the torque generated and applied to the cable during the process of the camera assembly 10 rotating around the first rotation axis 910. In the meantime, the resistance of the motor of the gimbal structure driving the entire camera assembly may be reduced.

In an embodiment of the present disclosure, the transition segment 123 may also include a second transition segment 1232 smoothly connected with the first transition segment 1231 and a third transition segment 1233 connected with the second transition segment 1232 through a bent connection. The second transition segment 1232 may be configured to axially extend along the first rotation axis 910. The third transition segment 1233 may be configured to protrude out of the housing for connection with an external device. That is, the first connection end 121 of the cable may be disposed on the first transition segment 1231 of the transition segment 123. The second connection end 122 of the cable may be disposed on the third transition segment 1233 of the transition segment 123. In some embodiments, a connection portion of the second transition segment 1232 and the third transition segment 1233 of the transition segment 123 of the cable (i.e., the bent transition part between the second transition segment 1232 and the third transition segment 1233) may be located on the first rotation axis 910, such that the second transition segment 1232 can smoothly transition to the third transition segment 1233, thereby reducing the pulling force or torque generated and applied to the cable during the rotation process of the camera assembly 10.

In the camera assembly 10 of the present disclosure, by configuring the second transition segment 1232 of the segment 123 of the cable to axially extend along the first rotation axis 910, the cable may pass through the rotation center (i.e., the first rotation axis 910) of the camera assembly 10, thereby reducing the pulling force generated and applied to the cable during the process of the camera assembly 10 rotating around the first rotation axis 910. In addition, the closer the second transition segment 1232 to the rotation center, the smaller the pulling force generated and applied to the cable during the process of the camera assembly 10 rotating around the first rotation axis 910. By connecting the third transition segment 1233 and the second transition segment 1232 of the transition segment 123 of the cable through a bent connection and protruding out of the housing of the camera assembly 10 to connect with an external device, the cable can smoothly transition from the first transition segment 1231 to the third transition segment 1233 of the transition segment 123.

In an embodiment of the present disclosure, the first transition segment 1231 of the transition segment 123 may bend around the first rotation axis 910 from a first side of the camera module 110 to a second side of the camera module 110. That is, in this embodiment, the wire routing manner of the camera assembly 10 may include: the first transition segment 1231 of the transition segment 123 bends from above the camera module 110 to transition to below the camera module 110, and then through the extending transition and bending transition of the second transition segment 1232 and the third transition segment 1233, the cable extends from a side of the camera assembly 10, as shown in FIG. 1. In some embodiments, the wire routing manner of the camera assembly 10 may include: the first transition segment 1231 of the transition segment 123 bends from below the camera module 110 to transition to above the camera module 110, then through the extending transition and the bending transition of the second transition segment 1232 and the third transition segment 1233, the cable extends from a side of the camera assembly 10.

The camera assembly 10 of the present disclosure may use any of the above two wire routing manners. Each may realize the purpose of the cable smoothly transitioning from the first transition segment 1231 of the transition segment 123 within the camera assembly 10 to the third transition segment 1233 and to extend from the camera assembly 10. Because the first connection end 121 and the second connection end 122 of the cable are fixed, the first transition segment 1231 of the transition segment 123 bending to transition from a first side of the camera module 110 to a second side of the camera module 110 can increase the bending radius and bending angle of the cable, thereby reducing the elastic force of the wire stock of the cable, and reducing the torque generated and applied to the cable during the process of the camera assembly 10 rotating around the first rotation axis 910. The second transition segment 1232 of the transition segment 123 may be disposed to axially extend along the first rotation axis 910, which enables the cable to pass through the rotation center of the camera assembly 10, thereby reducing the pulling force generated and applied to the cable during the process of the camera assembly 10 rotating around the first rotation axis 910.

Therefore, in the camera assembly 10 of the present disclosure, the first transition segment 1231, the second transition segment 1232, and the third transition segment 1233 of the transition segment 123 may use the above connection manners to transition to form the cable. Not only the purpose of lay out cable in the narrow and small space of the camera assembly 10 is realized, but also realized the effect of increasing the bending radius and bending angle of the cable. Further, the cable pass through the rotation center of the camera assembly 10, thereby reducing the torque and pulling force generated and applied to the cable during the process of the camera assembly 10 rotating around the first rotation axis 910.

In an embodiment of the present disclosure, the first transition segment 1231 and the second transition segment 1232 may be integrally formed. The second transition segment 1232 and the third transition segment 1233 may be integrally formed. In addition, the first transition segment 1231 may be a circular arc transition segment and the third transition segment 1233 may be a circular arc transition segment. In some embodiments, the bending angle between the third transition segment 1233 and the second transition segment 1232 may be in a range of 85 degrees to 95 degrees. By configuring the first transition segment 1231, the second transition segment 1232, and the third transition segment 1233 of the transition segment 123 to be integrally formed, and by adopting circular arc transition segments, the smooth transition effect of the cable can be increased, thereby further reducing the torque and the pulling force generated and applied to the cable during the process of the camera assembly 10 rotating around the first rotation axis 910.

In an embodiment of the present disclosure, the cable may include multiple wire stocks and a flexible printed circuit ("FPC") encapsulating the exterior of the multiple wire stocks. Combining the multiple wire stocks can increase the strength of the wire stocks, and effectively reduce the torque when the wire stocks experience large angle bending. In some embodiments, the multiple wire stocks of the cable may be co-axial wires, and may effectively reduce the internal stress of the cable.

In an embodiment of the present disclosure, the camera module 110 may include a connector 111. The first connection end 121 of the cable may be configured to connect with the connector 111. That is, the first transition segment 1231 of the transition segment 123 may bend, starting from the connector 111, from a first side of the camera module 110 to transition to a second side of the camera module 110.

In an embodiment of the present disclosure, the housing of the camera assembly 10 may include: a front camera cover 131 and a back camera cover 132 that are connected through a snap-fit connection. The camera module 110 may include a mounting base 112. The back camera cover 132 may include a receiving groove configured to receive the mounting base 112 of the camera module 110. The camera module 110 and the back camera cover 132 are disposed in a sandwich manner to form a receiving space therebetween configured for receiving the first transition segment 1231. Further, the hosing of the camera assembly 10 may be a cylindrical housing. The front camera cover 131 and the back camera cover 132 may both be a semi-cylindrical housing.

In an embodiment of the present disclosure, a first opening portion 1311 may be disposed on the front camera cover 131. A second opening portion 1321 matching the first opening portion 1311 may be disposed on the back camera cover 132. The first opening portion 1311 and the second opening portion 1321 may be connected to form an opening. The housing may also include a sealing cover 134. The sealing cover 134 may be disposed to cover the opening. Further, the sealing cover 134 may be disposed with a wire leading hole 135. The third transition segment 1233 may be disposed to penetrate the wire leading hole 135 to protrude out of the housing. In the embodiment shown in FIG. 1, the wire routing manner of the cable may be: the first connection end 121, through the first transition segment 1231 and starting from the connector 111, first bends from above the camera module 110 to transition to below the camera module 110, then through the extending transition and the bending transition of the second transition segment 1232 and the third transition segment 1233, extends from the wire leading hole 135 of the sealing cover 134 disposed at a side of the camera assembly 10.

In an embodiment of the present disclosure, the first rotation axis 910 may be a pitch axis of the gimbal structure. The camera assembly 10 may rotate around the pitch axis to realize the high angle shot and low angle shot.

To install the camera assembly 10 of the present disclosure, the mounting base 112 of the camera module 110 may be first placed in a receiving groove 133 of the back camera cover 132. Then the front camera cover 131 and the back camera cover 132 may be snap fit with one another. Finally, the sealing cover 134 may be mounted on the front camera cover 131 and the back camera cover 132. The wire routing manner of the cable inside the camera module 110 may be: the first connection end 121 of the cable, through the first transition segment 1231 and starting from the connector 111 of the camera module 110, bends from above the camera module 11o to transition to below the camera module 110, and then through the extending transition and bending transition of the second transition segment 1232 and the third transition segment 1233, extends from the wire leading hole 135 of the sealing cover 134 disposed at a side of the camera assembly 10.

Figure 3:
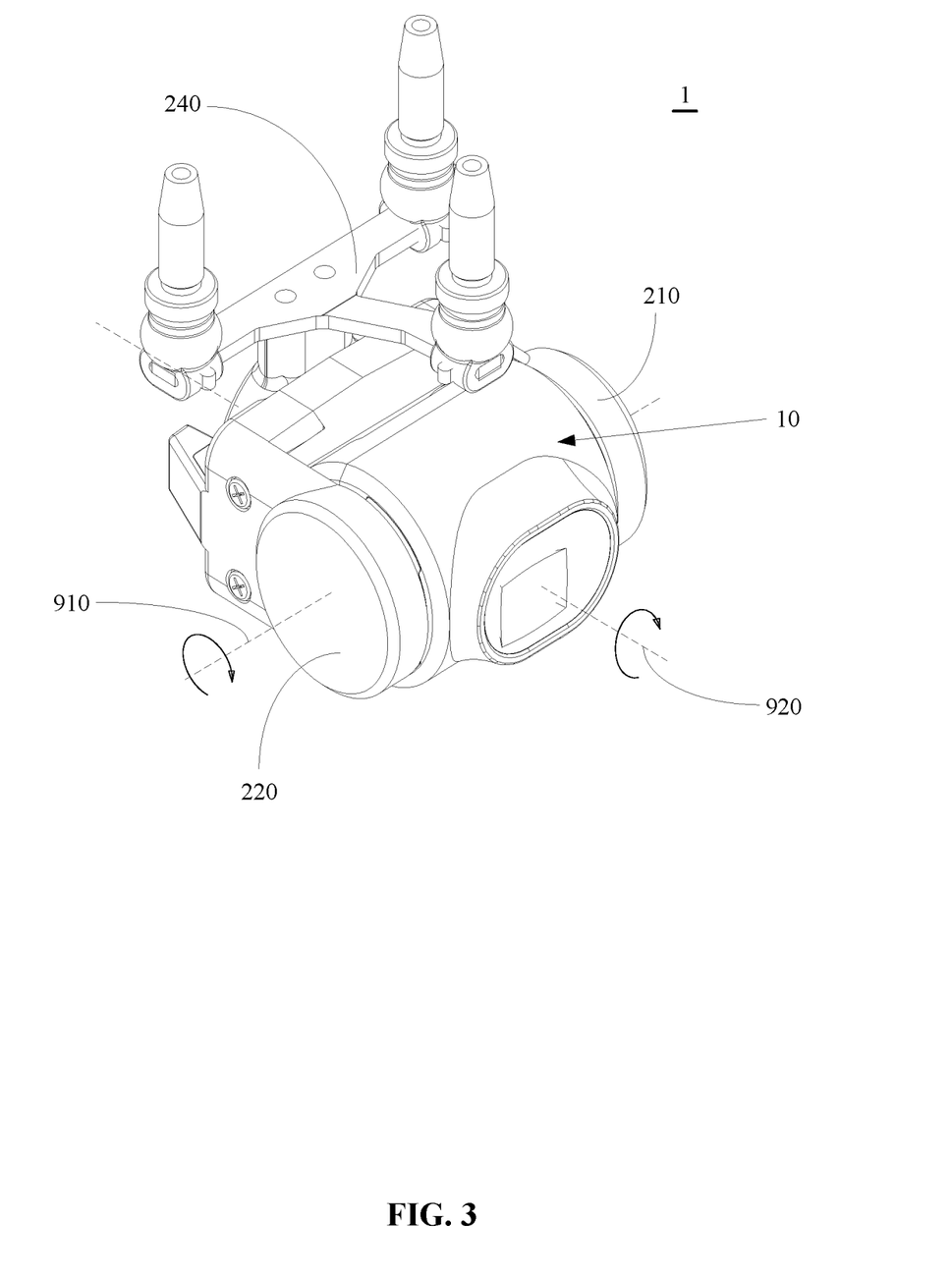
FIG. 3 is a structural illustration of the entire gimbal structure, according to an example embodiment.
Figure 6:
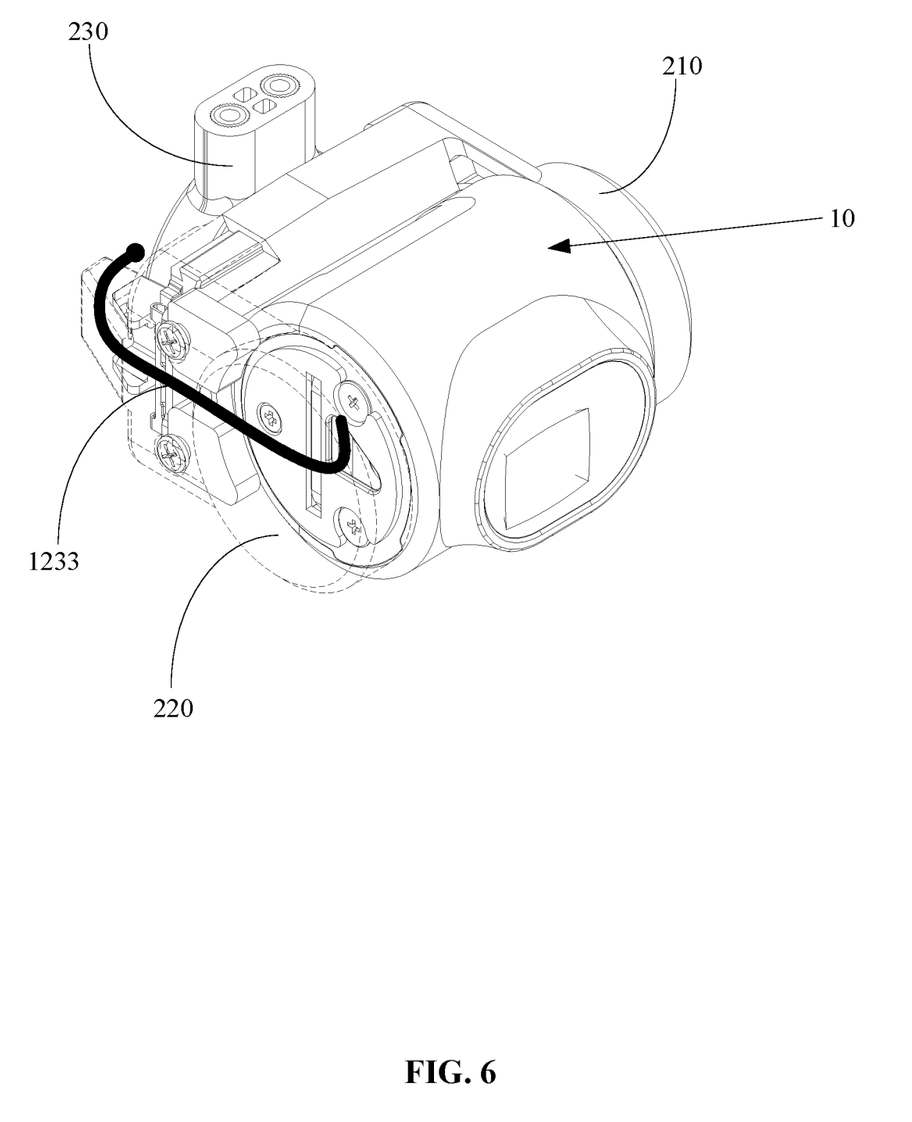

As shown in FIG. 3 and FIG. 6, the present disclosure also provides a gimbal structure 1, including a gimbal body and the camera assembly 10. The camera assembly 10 may be disposed on the gimbal body. It is understood that the descriptions of the camera assembly 10 in the above embodiments and implementation manners also apply to the gimbal structure 1 of the present disclosure.

In the gimbal structure 1 of the present disclosure, by the first transition segment 1231 of the transition segment 123 of the cable of the camera assembly 10 bending from a first side of the camera module 110 to transition to a second side of the camera module 110, the bending radius and the bending angle of the cable can be increased, thereby reducing the elastic force of the wire stock of the cable, and reducing the torque generated and applied to the cable during the process of the camera assembly 10 rotating around the first rotation axis 910. The second transition segment 1232 of the transition segment 123 may be disposed to radially extend along the first rotation axis 910, enabling the cable to pass through the rotation center of the camera assembly 10, thereby reducing the pulling force generated and applied to the cable during the process of the camera assembly 10 rotating around the first rotation axis 910, and reducing the resistance of the gimbal motor driving the entire camera assembly 10.

Figure 4:
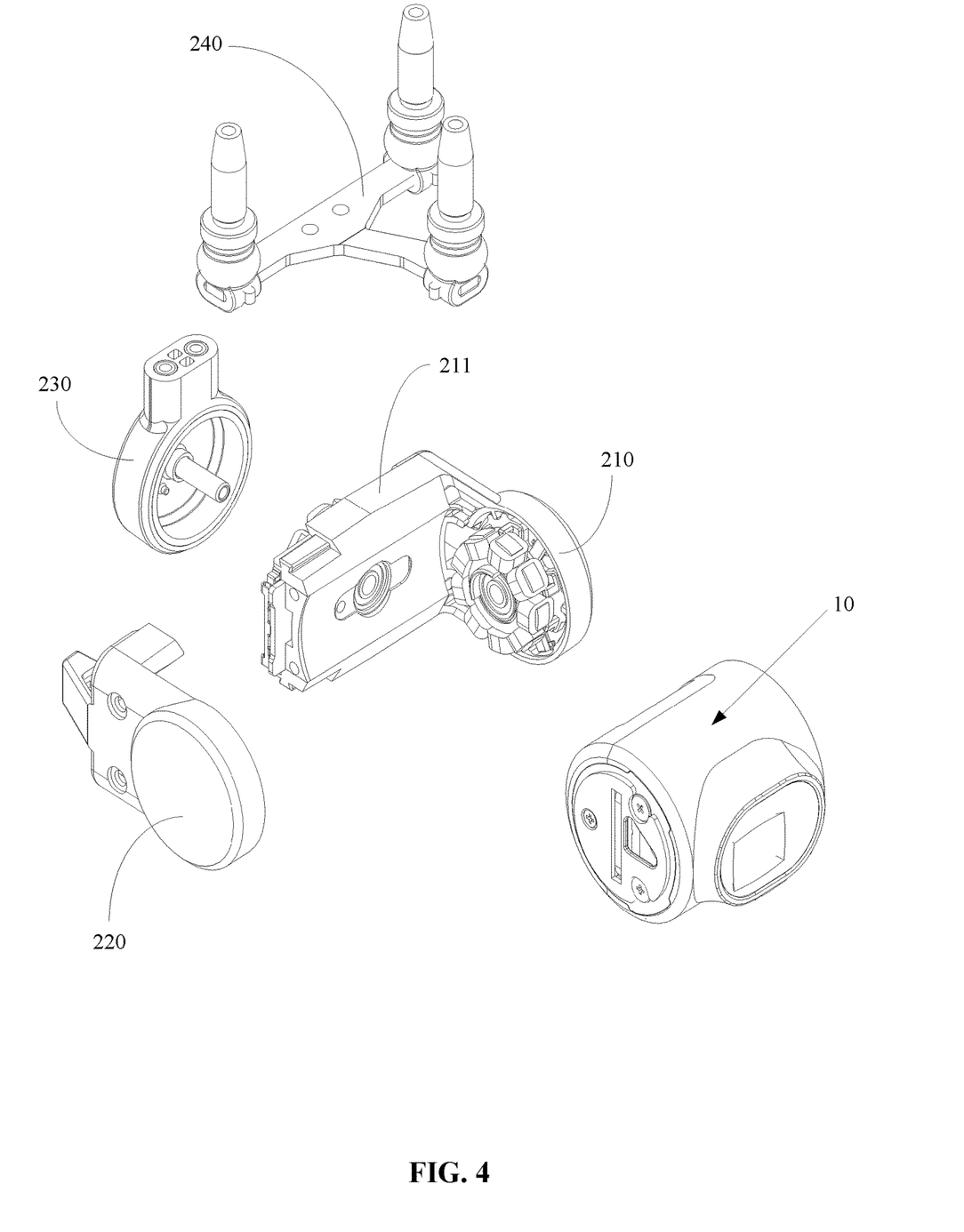
FIG. 4 is an exploded view of the gimbal structure, according to an example embodiment.

In an embodiment of the present disclosure, the gimbal structure 1 may include a first axis arm 210 configured to drive the camera module 110 to rotate around the first rotation axis 910 and a first axis arm end cover 220. The first axis arm 210 and the first axis arm end cover 220 may be disposed on two sides of the housing of the camera assembly 10 along the axial direction of the first rotation axis 910. In some embodiments, the first rotation axis 910 may be a pitch axis of the gimbal structure 1. The first axis arm 210 may be configured to drive the camera assembly 10 to rotate around the pitch axis (i.e., the first rotation axis 910) of the gimbal structure 1.

In an embodiment of the present disclosure, the gimbal structure 1 may be a two-axis gimbal. The gimbal structure 1 may include a second axis arm 230 configured to drive the camera module 110 to rotate around a second rotation axis 920 of the gimbal structure 1. The second axis arm 230 may be disposed on the housing along the axial direction of the second rotation axis 920. In some embodiments, the second rotation axis 920 of the gimbal structure 1 may be the roll axis. The second axis arm 230 may be configured to drive the camera assembly 10 to rotate around the roll axis (i.e., the second rotation axis 920) of the gimbal structure 1. As such, the first arm axis 210 may be a pitch axis arm, the second axis arm 230 may be a roll axis arm. The first axis arm 210 may also include a axis arm supporting frame 211 connected with the second axis arm 230. The axis arm supporting frame 211 may function to support the camera assembly 10 when installing or mounting the camera assembly 10. The second axis arm 230 may be provided with a connecting frame 240. The connecting frame 240 may be configured to connect the gimbal structure 1 with other devices.

Figure 5:
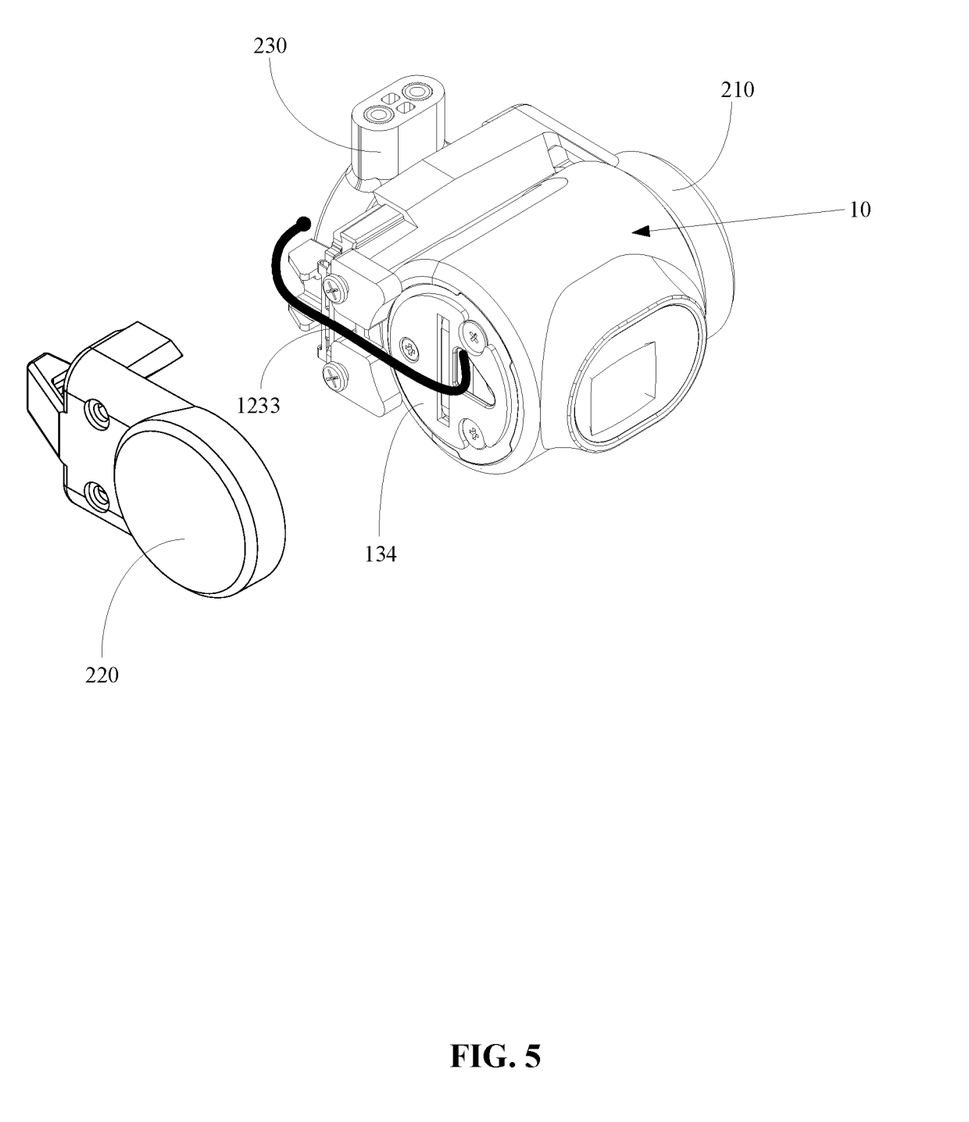
FIG. 5 and FIG. 6 are structural illustrations of wire routing of the gimbal structure, according to an example embodiment.

When mounting the gimbal structure 1 of the present disclosure, first, the axis arm supporting frame 211 and the second axis arm 230 may be connected. Then the camera assembly 10 may be mounted onto the first axis arm 210. At this moment, the third transition segment 1233 of the transition segment 123 may extend out of the sealing cover 134 of the camera assembly 10, as shown in FIG. 5. Then, the first axis arm end cover 220 may be mounted onto the sealing cover 134 of the camera assembly 10, as shown in FIG. 6. Because the cable of the camera assembly 10 of the gimbal structure 1 uses the wire routing manner in which the first transition segment 1231 of the transition segment 123 smoothly transitions to the third transition segment 1233 and then extends from the camera assembly 10, as described above in the above embodiments and implementation manners, the elastic force of the wire stock of the cable can be reduced. As a result, the rubbing between the cable of the camera assembly 10 and the first axis arm end cover 220 can be avoided to the maximum degree during the rotation of the camera assembly 10, thereby avoiding damages to the cable due to excessive rubbing. Accordingly, the operation lifetime of the cable can be extended.

It should be understood that in the present disclosure, relational terms such as "first" and "second," etc., are only used to distinguish an entity or operation from another entity or operation, and do not necessarily imply that there is an actual relationship or order between the entities or operations. The term "multiple" means two or more than two, unless otherwise defined. The terms "comprising," "including," or any other variations are intended to encompass non-exclusive inclusion, such that a process, a method, an apparatus, or a device having a plurality of listed items not only includes these items, but also includes other items that are not listed, or includes items inherent in the process, method, apparatus, or device. Without further limitations, an item modified by a term "comprising a . . . " does not exclude inclusion of another same item in the process, method, apparatus, or device that includes the item.

The disclosed methods and devices are described in detail. Examples are used to explain the principles and operations of the various embodiments. The descriptions of the embodiments are only for the purpose of explaining the methods and devices of the present disclosure. A person having ordinary skill in the art can modify or improve the various features of the present disclosure without departing from the principle of the various embodiments disclosed herein. Such modification or improvement also fall within the scope of the present disclosure. When no obvious conflict is created, various features shown in various embodiments may be combined in a single embodiment. The descriptions of the various embodiments in this specification are not intended to limit the scope of the present disclosure.

The contents disclosed in the present disclosure include materials that are subject to the copyright protection. The copyright is owned by the copyright owner. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A camera assembly of a gimbal structure, comprising:
   a housing including a front camera cover and a back camera cover, the back camera cover including a receiving groove;
   a camera module disposed inside the housing and being received in the receiving groove; and
   a cable disposed inside the housing, and comprising a first connection end, a second connection end, and a transition segment disposed between and connecting the first connection end and the second connection end,
   wherein the first connection end is configured to connect with the camera module, the second connection end is configured to connect with an external device located outside of the housing,
   wherein the transition segment comprises a first transition segment disposed bending around a first rotation axis of the gimbal structure,
   wherein the camera module and the back camera cover are disposed in a sandwich manner to form a receiving space configured to receive the first transition segment, and
   wherein the camera assembly is configured to rotate around the first rotation axis of the gimbal structure.

2. The camera assembly of the gimbal structure of claim 1, wherein the transition segment also comprises a second transition segment connected with the first transition segment, the second transition segment being configured to axially extend along the first rotation axis.

3. The camera assembly of the gimbal structure of claim 2, wherein the first transition segment and the second transition segment are integrally formed.

4. The camera assembly of the gimbal structure of claim 2, wherein the transition segment also comprises a third transition segment connected with the second transition segment through a bending connection, the third transition segment being disposed protruding from the housing.

5. The camera assembly of the gimbal structure of claim 4, wherein a bending angle between the third transition segment and the second transition segment is in a range of 85 degrees to 95 degrees.

6. The camera assembly of the gimbal structure of claim 4, wherein the second transition segment and the third transition segment are integrally formed.

7. The camera assembly of the gimbal structure of claim 4, wherein the third transition segment is a circular arc transition segment.

8. The camera assembly of the gimbal structure of claim 1, wherein the first transition segment is a circular arc transition segment.

9. The camera assembly of the gimbal structure of claim 1, wherein the cable comprises multiple wire stocks and a flexible printed circuit encapsulating an exterior of the multiple wire stocks.

10. The camera assembly of the gimbal structure of claim 1, wherein the first transition segment is configured to bend around the first rotation axis from a first side of the camera module to a second side of the camera module.

11. The camera assembly of the gimbal structure of claim 1,
    wherein the front camera cover and the back camera cover are connected through a snap-fit connection.

12. The camera assembly of the gimbal structure of claim 11,
    wherein the front camera cover comprises a first opening portion, the back camera cover comprises a second opening portion matching the first opening portion,
    wherein the first opening portion and the second opening portion are connected to form an opening, and
    wherein the housing further comprises a sealing cover disposed to cover the opening.

13. The camera assembly of the gimbal structure of claim 12,
    wherein the transition segment also comprises a third transition segment connected with the first transition segment, the third transition segment protruding from the housing, and
    wherein the sealing cover comprises a wire leading hole, and the third transition segment is configured to extend out of the housing through the wire leading hole.

14. The camera assembly of the gimbal structure of claim 11, wherein the housing is a cylindrical housing, and the front camera cover and the back camera cover are both semi-cylindrical housings.

15. The camera assembly of the gimbal structure of claim 1, wherein the camera module comprises a connector configured to connect with the first connection end.

16. The camera assembly of the gimbal structure of claim 1, wherein the first rotation axis is a pitch axis of the gimbal structure.

17. A gimbal structure, comprising:
a gimbal body; and
a camera assembly disposed on the gimbal body,
wherein the camera assembly comprises:
a housing including a front camera cover and a back camera cover, the back camera cover including a receiving groove;
a camera module disposed inside the housing and being received in the receiving groove; and
a cable disposed inside the housing, and comprising a first connection end, a second connection end, and a transition segment disposed between and connecting the first connection end and the second connection end,
wherein the first connection end is configured to connect with the camera module, the second connection end is configured to connect with an external device located outside of the housing,
wherein the camera module and the back camera cover are disposed in a sandwich manner to form a receiving space configured to receive the first transition segment, and
wherein the transition segment comprises a first transition segment disposed bending around a first rotation axis of the gimbal structure.

18. The gimbal structure of claim 17, wherein the transition segment also comprises a second transition segment connected with the first transition segment, the second transition segment being configured to axially extend along the first rotation axis.

19. The gimbal structure of claim 17, wherein the first transition segment is configured to bend around the first rotation axis from a first side of the camera module to a second side of the camera module.

20. The gimbal structure of claim 17, wherein
the front camera cover and the back camera cover are connected together through a snap-fit connection.

* * * * *